United States Patent [19]

Stefan

[11] Patent Number: 5,044,864
[45] Date of Patent: Sep. 3, 1991

[54] LIFT FOR A SLOT MACHINE STAND

[76] Inventor: Alexander Stefan, 216 E. Arby Ave., Las Vegas, Nev. 89119

[21] Appl. No.: 575,355

[22] Filed: Aug. 30, 1990

[51] Int. Cl.⁵ .......................................... B60P 3/00
[52] U.S. Cl. .................................. 414/459; 254/45
[58] Field of Search ............................ 414/458–461, 414/495; 254/45

[56] References Cited

U.S. PATENT DOCUMENTS

| | | | |
|---|---|---|---|
| 3,010,592 | 11/1961 | Chadwick | 414/458 |
| 3,348,711 | 10/1967 | Gove | 414/459 |
| 3,486,650 | 12/1969 | Boone | 414/458 |
| 3,744,652 | 7/1973 | Rieschel | 414/459 |
| 3,944,094 | 3/1976 | Compton | 414/458 |
| 4,015,736 | 4/1977 | Erickson | 414/458 |
| 4,491,452 | 1/1985 | Matovich | 414/458 X |
| 4,934,893 | 6/1990 | Johnson | 414/458 |

Primary Examiner—David A. Bucci
Attorney, Agent, or Firm—Charles C. Corbin

[57] ABSTRACT

Apparatus for lifting and rendering mobile for movement about a floor, a stand upon which a plurality of slot machines are mounted, the stand having a front wall and a rear wall, and a top wall upon which the slot machines are mounted, the invention including wheel-equipped lifting assemblies that are removably mountable to the stand, and each lifting assembly comprising a horizontally extending cross-bar that spans the stand top and lies adjacent thereto, and a pair of wheeled upright members attachable to opposite ends of the cross-bar and lying adjacent the stand side walls, the upper part of each upright being adapted to slidably embrace the cross-bar to firmly hold it at about 90° to the cross bar and to be adjustable therealong with a device to releasably clamp the cross-bar to the upright member. The lower portion of the upright member is adapted to engage a lower edge portion of the stand and the upright member includes a lifting-jack equipped component with a floor-engaging wheel that is operative to extend downwardly to engage the floor and to urge the remainder of the upright member upwardly to engage the stand and raise it off the floor. A plurality of lifting assemblies mounted to the stand at spaced apart locations are operative to support the stand on wheels so that the stand may be rolled to other locations on the floor and lowered into a new position as desired.

11 Claims, 3 Drawing Sheets

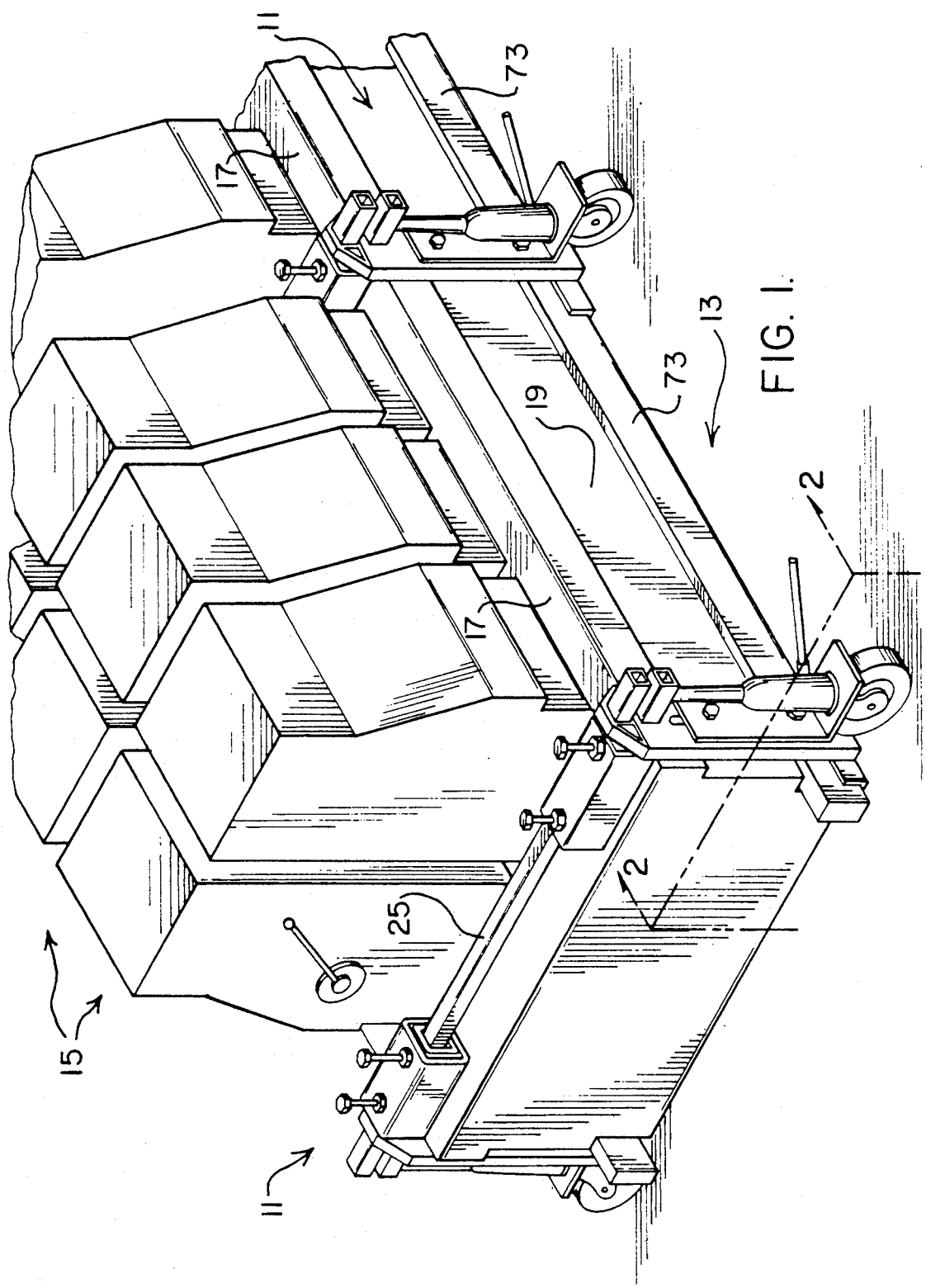

LIFT FOR A SLOT MACHINE STAND

BACKGROUND

1. Field of the Invention

The present invention relates to apparatus for moving a heavy floor-mounted stand for an array of slot machines, and more particularly to apparatus that is releasably mountable to a stand to support it on wheels.

2. Description of the Prior Art

In a typical casino layout slot machines are often installed in arrays of six to eight machines on the top of a generally rectangular stand. The slot machine stands may be arranged end-to-end in various floor layouts with aisles between the spaced-apart stands. There often arises the need to rearrange the floor position of the slot machine stands to comply with a new interior decorating scheme, or to change aisle width, for example. The conventional method of moving slot machine stands is manpower-intensive, somewhat hazardous and time consuming. Typically, at least two men will first lighten the heavily weighed stand by disconnecting each one of the array of several slot machines placing it on the floor. Hand trucks are then used by the movers to maneuver the stand to its new location. The lifting and physical exertion required put the workers at risk of physical injury. Further handling of the slot machines is required when they are placed back upon the stand and reattached thereto. The down time involved is costly not only in man hours expended, but in lost slot machine earnings.

SUMMARY OF THE INVENTION

In view of the aforestated drawbacks of conventional means of moving slot machine stands it is a general object of the present invention to provide apparatus for shifting the floor position of a slot machine stand in a manner that is quick, safe and cost-effective.

Another object of the present invention is to provide apparatus, removably mountable to a slot machine stand for lifting and moving the stand.

Still another object is to provide for the relocating of a slot machine stand without the necessity of having to first disconnect and dismount the slot machines from the stand.

Yet another object of the present invention is to provide apparatus by which a stand for slot machines may be supported on wheels so as to be rollingly relocatable on the floor.

These, and other objects and advantages are provided by the present invention which comprises apparatus for lifting and rendering mobile a floor-mounted stand upon which a plurality of slot machines are mounted, the stands having spaced apart front wall and rear walls, and a top wall upon which the machines are mounted, the front wall and rear wall each having a lower edge portion that is inwardly recessed to provide a downwardly facing ledge. The invention features lifting assemblies that are removably attached to the slot machine stand at spaced-apart locations, each lifting assembly comprising a cross-bar lying horizontally and adjacent to the stand top, and a pair of wheel-equipped upright members engaging opposite ends of the cross bar and lying adjacent to the front and rear walls. The upper part of each upright member is adapted to slidably embrace the cross bar for inward and upward adjusting movement and to hold the upright member at about 90° to the cross bar, and there is means for releasably securing and holding stationarily an upright member to the cross bar. The lower end of each upright member is adapted to make uplifting engagement with a lower ledge portion of the front wall and the rear wall respectively. There is a downwardly extendable wheeled component mounted to each upright member including a member with a floor engagable wheel on its lower end and mounted to the upright member for vertical movement relative thereto, and finally a lifting jack mechanism is operative to urge the wheeled portion downwardly and the upright member upwardly to bring it into lifting engagement with the lower ledge of the stand. Thus the lifting jack mechanisms on the plurality of lifting assemblies are operative to raise the slot machine stand off the floor and onto the wheels of the assemblies. In a preferred embodiment of the invention there is included means attachable to the cross bar for engaging the stand top and urging the cross bar away from the stand top so as to bring the lower end of the upright member towards clamping engagement with the lower ledge of the stand side wall. A preferred embodiment also includes an elongated horizontally extending member adapted to fit between the side wall lower ledge and an inwardly projecting lifting blade of the upright member so as to be compressed therebetween.

The accompanying drawings which form a part of the specification illustrate a preferred embodiment of the invention, and together with the description serve to explain the principals of the invention.

BRIEF DESCRIPTION OF THE DRAWINGS

FIG. 1 is a perspective view showing a preferred embodiment of the apparatus of the present invention mounted to a stand for slot machines;

DETAILED DESCRIPTION OF THE INVENTION

Figure 3:
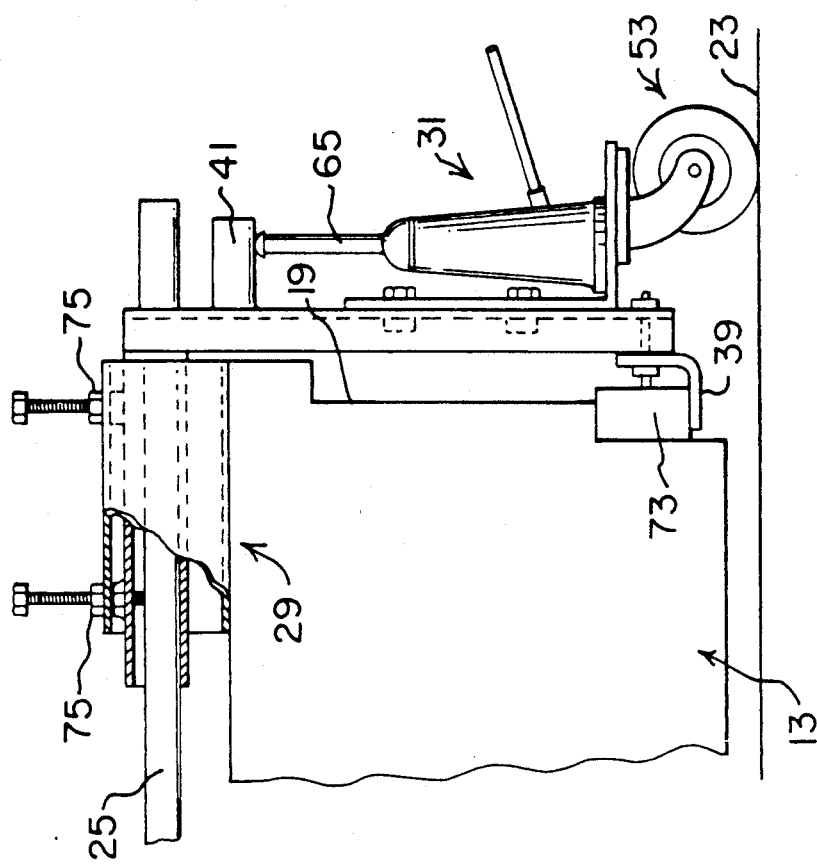
FIG. 3 is a view similar to FIG. 2 but showing the apparatus in its stand supporting configuration.
Figure 2:
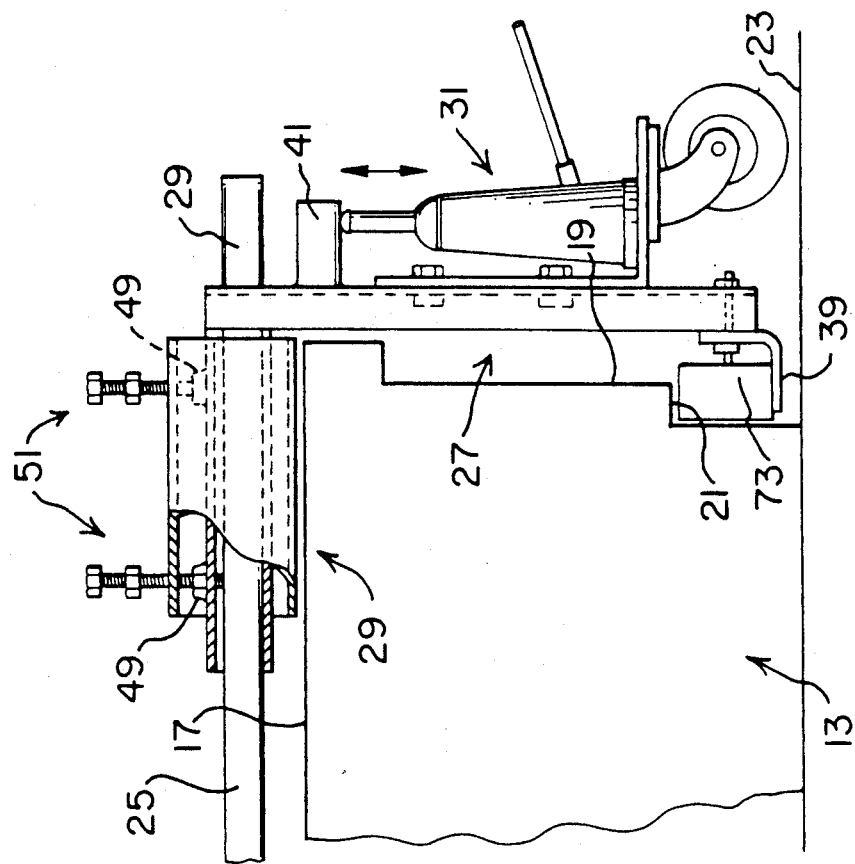
FIG. 2 is a partial, front elevational view taken along the lines of 2—2 of FIG. 1.
Figure 4:
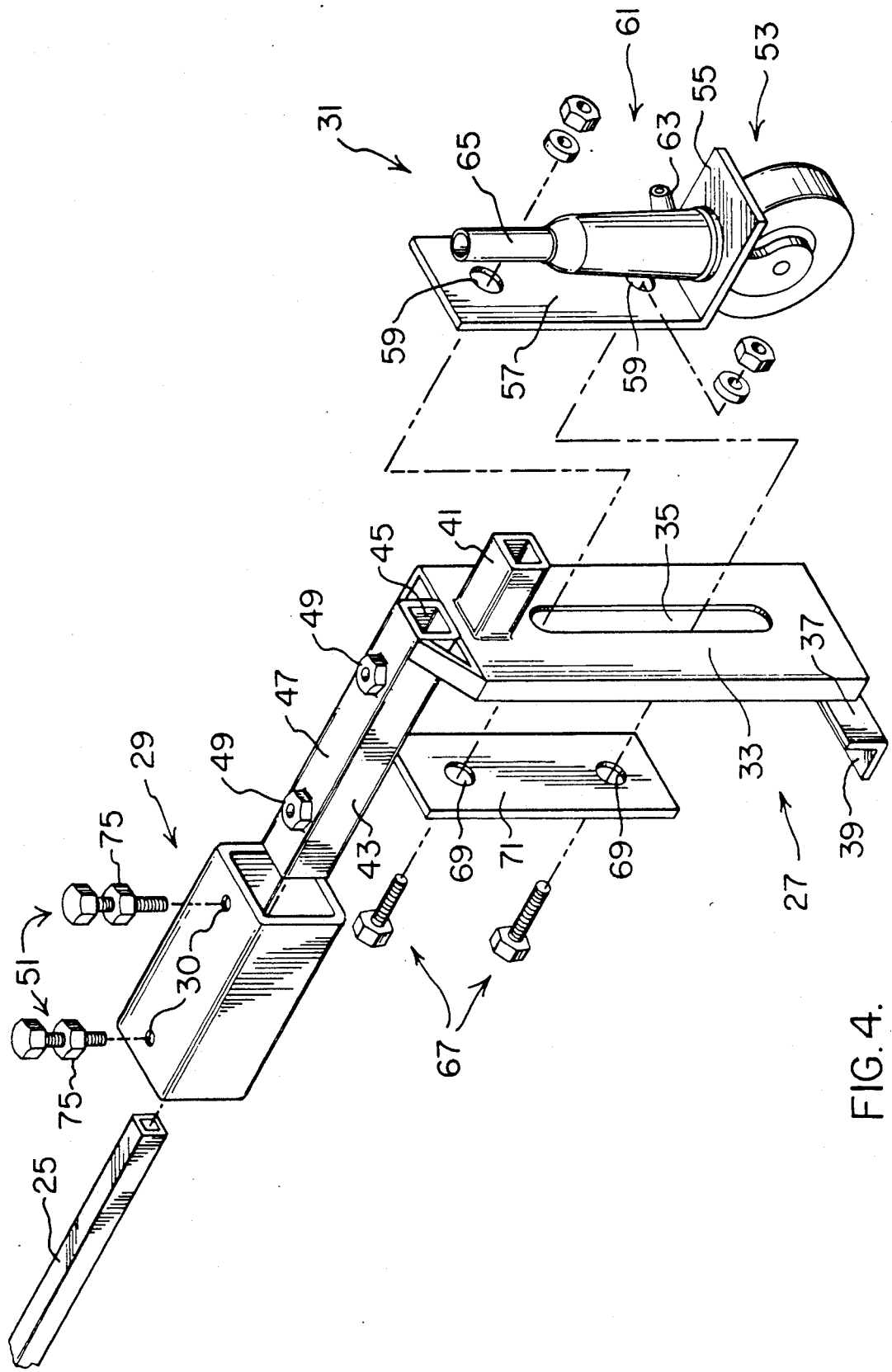
FIG. 4 is an exploded perspective view of the side member and wheeled component of the apparatus of the present invention.

Referring now to the drawings, FIG. 1 shows lifting assemblies 11 according to the present invention applied to a stand 13 which supports an array of several conventional slot machines 15. Stand 13 is typically of wooden construction with a top wall 17 to which the slot machines 15 are attached, and has spaced-apart side walls 19 each of which has a recessed lower edge as best shown in FIG. 2 which provides a downwardly facing ledge 21 against which a lifting force can be applied in a manner to be described hereinafter. The stand 13 may be a part of a module holding three or four pairs of slot machines 15 which modules may be arranged on a casino floor in end-to-end relationship and spaced apart to form aisles as desired.

The figures show that each lifting assembly 11 includes a cross bar 25, which is fabricated of conventional steel bar stock of square channel configuration. Each lifting assembly 11 also features, to be used in pairs with each cross bar 25, an upright side member 27, a clamping element 29, and an extendable wheeled component 31. These components are also fabricated substantially of bar stock using conventional metal working and welding techniques. Note that each upright side member 27 has a vertical arm 33 that is provided with a vertically extending slot 35. A lifting bracket 37 is affixed to arm 33 and provides an inwardly projecting lifting blade 39. Welded to the outer face of the vertical arm 33, above slot 35, is a horizontally projecting stop 41. Finally, the upright side member 27 includes a bracket 43 that is welded to the top of the vertical arm 33 and projects horizontally inward, and provides a through channel 45 which is configured to slidably and snugly receive the cross bar 25. There are a pair of bores (not shown) through the top wall of bracket 43 above which bores are welded a pair of threaded nuts 49 as illustrated. Nuts 49 will receive clamping bolts 51 in a manner that will be described.

The clamping element 29 is a section of channel stock that to envelope the bracket 43 as FIG. 2 illustrates and its vertical interior dimension is appreciably greater than the vertical thickness of bracket 43, including the welded nut 49, for reasons that will become apparent upon further reading, and there are twin bores 53 through the upper wall of bracket 43 which are sized to pass the threaded portions of clamping bolts 51 without interference.

Finally, the extendable wheeled member in the preferred embodiment includes an L-shaped bracket that has a suitable conventional caster-type wheel assembly 53 affixed to the horizontal platform 55 and a vertical portion 57 with bores 59 therethrough. A conventional hydraulic jack 61, with a pumping arm at 63 and extendable shaft 65, is attached at its base to the horizontal platform 55. The wheeled component 31 is attached to the vertical arm 33 of the side member 27 by using nut-and-bolt pairs 67 which engage the bores 69 of a back plate 71, the slot 35 and the bores 59. The nut-and-bolt pairs 67 are not completely tightened and this will sandwich the vertical arm 33 between plates 71 and the vertical portion 57 in a manner which guides the wheeled component 31 in slidable vertical motion relative to the upright side member 27. As FIG. 2 shows the top end of the extendable shaft 65 will be aligned below the stop 41. The preferred embodiment of the invention may include an elongated pressure-bearing member 73 which is a two-by-four lumber piece sufficiently long to span the distance between lifting assemblies 11 as illustrated in FIG. 1.

The aforedescribed apparatus may be used advantageously to change the floor position of a slot machine stand 13 in the following manner. Each lifting assembly 11 is prepared for mounting by positioning clamping element 29 over the bracket 43 and placing the clamping bolts 51 through the bores 30 and into threaded engagement with the welded nuts 49. It should be noted that the nuts 75 carried on the clamping bolt 51 have an initial position spaced from the top of clamping element 29. With the lower end of bolt 51 partially engaged in the welded nut 49 an end portion of a cross bar 25 may be inserted in channel 45 of the bracket 43 with the cross bar 25 lying parallel to top wall 17 of the stand 13 and the upright side member 27 lying adjacent the side wall 19 of the stand. In a similar fashion the other end portion of cross bar 25 engages a second, complementary side member that lies adjacent the opposite side wall of the stand 13. As FIG. 1 illustrates a second lifting assembly 11 is similarly mounted to the stand 13 at a spaced-apart location. Then, at both sides of stand 13, the two-by-four piece 73 is placed upon lifting blade 39 and positioned below the stand ledge 21 as illustrated in FIG. 2.

The shaft 65 of the hydraulic jack 61 is in an initial lowered position. The clamping bolts 51 may then be tightened causing their lower ends to make binding contact with the top of cross bar 25. In order to firmly mount a lifting assembly to the stand 13 the nuts 75 may then be tightened. This will force the bottom of the clamping element 29 downwardly into contact with the stand top wall 17 which raises the upright side member 27 causing blade 39 to compress the two-by-four piece into the ledge 21. FIG. 2 illustrates the preliminary positioning of lifting assembly 11. With each of the assemblies 11 clamped in this manner the stand 11 may then be raised by using the hydraulic jacks 61. Thus by using the pumping arm 63 the extendable shaft 65 is urged upwardly to abut the stop 41, with further pumping causing the upright member to be pushed upwardly as the wheeled component 31 is urged downwardly causing the stand to be raised off the floor 23. Thus, where a pair of lifting assemblies 11 are employed the stand 13 may then be completely supported on wheels and rendered mobile to be rollingly relocated as desired. At a new floor location the hydraulic pressure in the jacks 61 may be released to lower the stand 13 to the floor, and the lifting assembly 11 may then be disassembled in a manner which is apparent.

A preferred embodiment has been described and it shall be appreciated with those in ordinary skill in the art, that within the scope of the invention, various changes may be made. Thus it is aimed to cover all changes and modifications that fall within the true spirit and scope of the invention.

What is claimed is:

1. Apparatus for lifting and rendering mobile on a floor a stand upon which a plurality of slot machines are mounted, said stand including a top wall and spaced-apart front and rear side walls, said front wall and rear wall each having a lower edge portion with an inwardly recessed ledge, said apparatus comprising:
   a) a plurality of lifting assemblies adapted to be mounted to said stand at spaced-apart locations therealong, and each said assembly including:
      1) rigid, horizontally extending cross-bar spanning and lying adjacent to said stand top wall;
      2) a pair of upright members adapted to be attached to opposite end portions of said cross-bar so as to lie adjacent said respective stand side walls, the upper portion of each upright member adapted to slidably embrace said cross bar for inward and outward adjustment with respect to said cross bar and to hold said upright member at about 90° to said cross bar, a lower end of said upright member adapted to make uplifting engagement with said stand lower edge;
      3) means for releasably securing each said upright members to said cross bar;
      4) a wheel-equipped extension member mounted to said upright member for guided vertical motion and including a wheel mounted at a lower end of said extension member; and
      5) lifting-jack mechanism for engaging said upright member and urging it upwardly into lifting engagement with said stand and for urging said extension member downwardly whereby said plurality of lifting assemblies are operative to elevate said stand off said floor so as to be rollingly supported on said wheels.

2. Apparatus as defined in claim 1 including clamping means for engaging said stand top wall and urging said cross-bar upwardly away from said stand top wall.

3. Apparatus as defined in claim 1 wherein a lifting blade extends inwardly from the lower end of said upright member.

4. Apparatus as defined in claim 3 including a horizontally extending elongated member adapted to be located between said lifting blade and said stand ledge and to be compressed therebetween.

5. Apparatus as defined in claim 1 wherein the upper portion of said upright member has a cross bar receiving element with a horizontally extending channel for embracing said cross bar and said cross bar securing means is attached to said cross bar receiving element.

6. Apparatus as defined in claim 2 wherein the upper portion of said upright member has a cross-bar receiving element with a horizontally extending channel for embracing said cross-bar and said cross-bar securing means is attached to said cross-bar receiving element.

7. Apparatus as defined in claim 1 wherein said jack mechanism has an extendable end that engages an upper portion of said upright member.

8. Apparatus as defined in claim 7 wherein said lifting-jack mechanism is a hydraulic jack.

9. Apparatus as defined in claim 6 wherein said securing means includes at least one bolt threadedly received through a wall of said element.

10. Apparatus as defined in claim 9 wherein said means for urging said bar upwardly includes a component that is slidably mounted to said at least one bolt, and including a nut on said bolt which may be turned to engage and downwardly urge said component towards engagement with said stand top wall.

11. Apparatus as defined in claim 2 wherein said means for urging said cross-bar away from said stand top wall is attached to an inward extension of said upright member and is adapted to extend downwardly into engagement with said stand top wall.

* * * * *